United States Patent
Muller

[11] Patent Number: 5,824,349
[45] Date of Patent: *Oct. 20, 1998

[54] STRESS-FREE DOUGH SHEETER WITH PNEUMATICALLY ASSISTED RELEASE

[75] Inventor: Bernardus Wilhelmus Muller, Blythewood, S.C.

[73] Assignee: Interko, Inc., Blythewood, S.C.

[*] Notice: The term of this patent shall not extend beyond the expiration date of Pat. No. 5,733,583.

[21] Appl. No.: 579,724

[22] Filed: Dec. 28, 1995

Related U.S. Application Data

[63] Continuation-in-part of Ser. No. 491,117, Jun. 16, 1995, Pat. No. 5,733,583.

[51] Int. Cl.⁶ .............................. A21C 3/10; A21C 9/08; A21C 11/10
[52] U.S. Cl. .......................... 425/145; 425/147; 425/227; 425/238; 425/373; 426/502; 426/503; 83/169
[58] Field of Search ...................... 425/145, 147, 425/143, 238, 239, 241, 294, 373, 308, 309, 227, 232, 437, 449; 426/502, 503, 517, 518; 83/168, 169, 98, 99

[56] References Cited

U.S. PATENT DOCUMENTS

| | | | |
|---|---|---|---|
| 2,039,313 | 5/1936 | Haas | 83/168 |
| 3,464,299 | 9/1969 | Gagnon | 83/99 |
| 3,773,448 | 11/1973 | Poot | 425/239 |
| 4,488,464 | 12/1984 | Rooke et al. | 83/99 |
| 4,626,188 | 12/1986 | Morgenthaler et al. | 425/145 |
| 4,692,107 | 9/1987 | Morikawa et al. | 425/145 |
| 4,902,524 | 2/1990 | Morikawa et al. | 425/238 |
| 5,118,274 | 6/1992 | Morikawa et al. | 425/145 |
| 5,204,123 | 4/1993 | Hayashi et al. | 425/145 |
| 5,227,174 | 7/1993 | Konig | 425/239 |
| 5,314,322 | 5/1994 | Morikawa et al. | 425/145 |
| 5,427,515 | 6/1995 | Muller et al. | 425/238 |
| 5,496,578 | 3/1996 | Muller et al. | 425/145 |
| 5,505,970 | 4/1996 | Morikawa | 425/145 |

FOREIGN PATENT DOCUMENTS

| | | | |
|---|---|---|---|
| 1171122 | 5/1964 | Germany | 83/169 |
| 61-282056 | 12/1986 | Japan | 83/169 |
| 4-320640 | 11/1992 | Japan | 425/238 |

*Primary Examiner*—Duane S. Smith
*Attorney, Agent, or Firm*—Handal & Morofsky

[57] ABSTRACT

A dough sheeting system having a cutter assembly for pulling and cutting elongated chunks of dough from a hopper containing dough is disclosed. A receiving surface is disposed beneath the cutter assembly. A motor advances the receiving surface in a direction of dough feed. A calendar assembly receives dough output by the receiving surface and outputs a sheet of dough. A level sensor monitors the height of accumulated dough at the input of the calendar assembly and produces a signal when the input exceeds a predetermined level. The motor is responsive to the signal from the level sensor to stop advancing the receiving surface when the level exceeds the predetermined level. A movement sensor monitors the advancement of the receiving surface to actuate the cutter assembly to pull and cut a chunk of dough when the surface has advanced a predetermined distance from the position at which the surface was positioned when a prior chunk of dough was delivered to the surface. Release of a dough chunk is enhanced by using a pneumatic source to introduce air between the dough chunk and the cutter assembly. A pulling assembly is disposed under the cutter assembly and is responsive to the operation of the cutter assembly to pull chunks of dough from the cutter assembly.

30 Claims, 15 Drawing Sheets

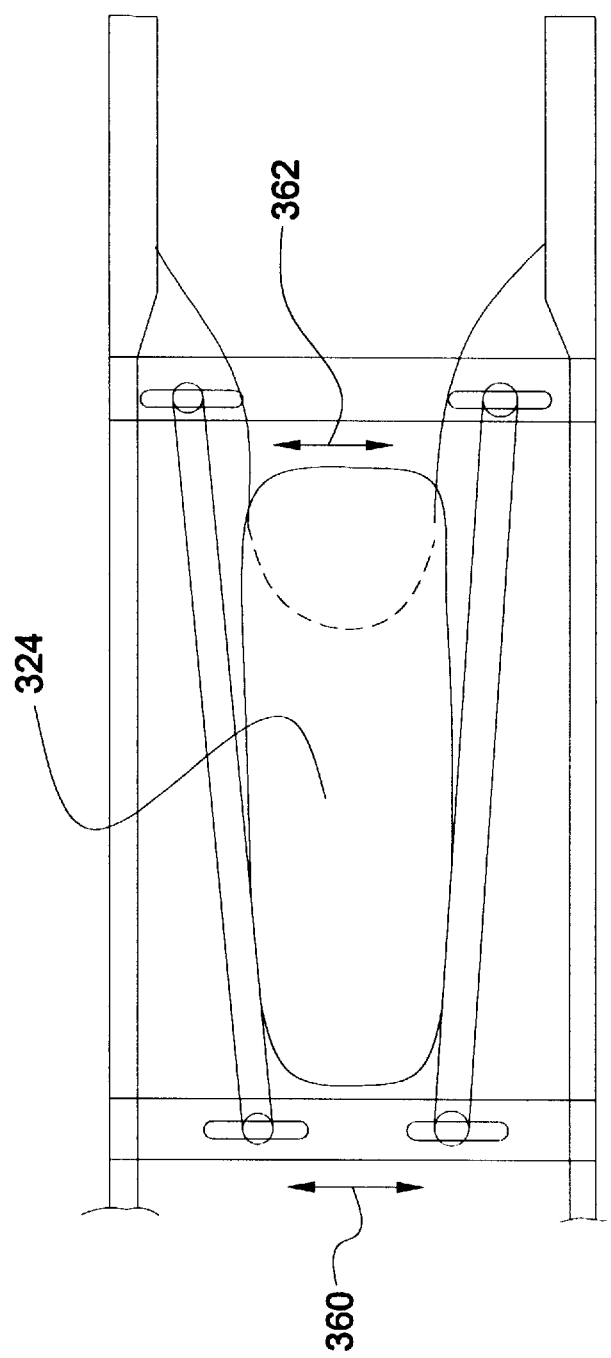

STRESS-FREE DOUGH SHEETER WITH PNEUMATICALLY ASSISTED RELEASE

CROSS-REFERENCE TO RELATED APPLICATIONS

This application is a continuation-in-part of U.S. Pat. application Ser. No. 08/491,117 of Muller, filed Jun. 16, 1995 and entitled "STRESS FREE DOUGH SHEETING SYSTEM." now U.S. Pat. No. 5,733,583.

TECHNICAL FIELD

The present invention relates to a dough sheeting system of the type in which a volume of dough is flattened by a calendar surface into a dough sheet after being cut into a series of dough chunks.

BACKGROUND

Unlike cakes, cookies and other baked goods of the type which rely upon chemical-based rising agents, yeast breads and pie crusts have relatively demanding dough or batter working or kneading requirements. This is because, in the case of yeast-based products, the biological release of the gas which causes the dough or batter to rise does not occur over a relatively short period of time, as in the case of batters containing sodium bicarbonate, but rather occurs over extended periods of time ranging from as long as several hours (in the case of baker's yeast infused doughs) to several days (in the case of so-called salt breads, which have no added yeast in their recipes, but rather rely on the incorporation of yeast from the environment into the dough).

Rather than relying upon the quick release of gases, yeast breads, which typically have dough recipes consisting of flour, water, salt and baker's yeast, rely upon repeated mechanical deformation or kneading for the development within the dough of an elastic gluten matrix. The two basic building blocks of the gluten, namely, glutenin and gliadin are naturally and separately occurring materials in wheat. Such mechanical deformation typically takes the form of a pushing and pulling kneading action. When water is added, for example, to wheat flour, and the mixture is kneaded, these two components are forced out of the particles of flour. Thus, released, the glutenin and gliadin link in the presence of the water. The linked components form molecular chains of relatively long length. These molecular chains form a matrix of substantially randomly oriented gluten strands, within which remaining components of the wheat are trapped resulting in an elastic mass.

Classically, the gluten matrix is developed by mixing the water, flour, salt and yeast together to form a batter or dough which is then kneaded by hand. The working of the dough with the hands causes the formation of gluten. The more that the flour is worked, the more gluten is released.

However, after the proper amount of kneading, dependent upon the dough (with more working required in the case of doughs having generally higher water content), substantially all the usefully releasable gluten will have been developed and released into the dough. In this condition, the matrix is sufficiently developed that the dough mass will recover its shape when pressed or will elastically return, to a limited extent, to its original shape when pinched and pulled. After the proper amount of kneading has been performed on the dough, any hoped for improvement (at the microscopic level) in the quality of the dough that will be provided by any additional gluten, released by further kneading the dough, will be insubstantial or non-existent, while substantial damage to the gluten chains will start occurring. This results in a net decrease in dough quality. This condition is often referred to as "overkneading". Generally, the rheology of the dough is such that, during overkneading, damaging stresses are applied to an already sufficiently formed gluten matrix and the elasticity of the dough is damaged.

However, this elastic condition of the dough is exactly what allows the dough to rise prior to baking. In particular, as the yeast multiplies in the presence of water and salt, the yeast microorganisms release carbon dioxide into the elastic dough and gluten matrix. This carbon dioxide tends to form tiny bubbles which expand and stretch the gluten matrix beyond the breaking point causing the tiniest bubbles to merge into other small bubbles. The air bubbles thus become progressively larger as merging continues, thus forming progressively larger bubbles. Thus, damage to the gluten matrix prior to rising must be avoided. Failure to preserve the quality of the gluten matrix will result in such defects as uneven or incomplete rising of the dough.

To better understand this, overkneading, whether by pressure or by pulling, will both result in stretching out the molecular chains into relatively straight chains. Under further stress the chains will be pulled past the breaking point, thus damaging the overall elasticity of the gluten and its ability to incorporate a great number of relatively small air chambers for containing the entrapped carbon dioxide produced by the yeast. In the most extreme case, almost all of the elasticity of the dough will be destroyed and the ability of the dough to rise will be severely compromised. The end result may be a bread of relatively dense character for the particular flour components in the recipe, or a bread incorporating large voids in some parts of its architecture and relatively small voids in other parts. This may result in part of the baked bread having a dough-like characteristic on account of resultant unevenness in the cooking of the bread. Such unevenness in cooking is to a large extent a direct result of the non-uniformity in the architecture of the raised unbaked dough.

Thus, overkneading or other forms of overworking of dough after sufficient gluten has been released is to be avoided. The result of such overworking goes beyond the mere aesthetics or the uniformity of the cooked product. A poor rise in the dough may make it necessary to use a greater amount of flour in order to manufacture the desired product. This means correspondingly greater costs. Thus, even in situations, such as pizza manufacture, where relatively broad ranges in the quality of the risen dough may be tolerated from the standpoint of acceptable product to the consumer, e.g. dense, through light "bready" crusts, on through "crispy" crusts, there are still strong economic reasons for achieving a good rise in the unbaked dough.

One way of addressing this problem is to let the dough rest for a time between successive workings. During the resting period, substantial repair of the gluten structure can occur. The use of a kneading step, followed by a first rise, followed by a second kneading and a final rise type process will also result in a repair of the dough's gluten matrix where the same has been damaged by overkneading. However, such repair processes are not complete and add costs. Moreover, where knead and rise processes are properly done, the products are substantially the same as those made in double rise processes.

The other approach for obtaining a dough with good elasticity is to carefully design the dough working process to ensure that the dough is not overworked during kneading or subsequent dough forming steps such as calendaring into sheets, sheet reduction, lamination of dough layers (for example, in croissant manufacture), or the like.

One of the general solutions to preservation of the integrity of the gluten matrix is to have repeated gentle and relatively small working steps, separated by periods during which the dough is allowed to return to a relatively relaxed state. This works because after returning to the relaxed state the dough has also resumed a new more relaxed configuration for the gluten matrix. Thus subsequent working will proceed from a relatively relaxed configuration. This will be less likely to cause damage to the gluten matrix. This compares to relatively deep dough working steps, or, even more damaging, continuous working, which is far more likely to stretch the gluten chains beyond the breaking point, and do significant damage.

Similar problems are also posed in the handling of flaky unleavened crust doughs which, typically have relatively high fat content, as are employed in the manufacture of such products as pies and dumplings. More particularly, such flaky finished product structures depend upon localized stratifications of flattened water and flour dough strata which, under ideal circumstances, are separated and maintained as discrete elements during handling by a layer of relatively fatty material such as oil, butter, hydrogenated oil (such as margarine), or lard.

Pie doughs are typically made to incorporate such stratified structures by forming a dough of comminuted cold margarine, flour and cold water. The dough is then formed with a minimum of handling into a solid mass. Any extra handling will have the undesirable effect of working the margarine or other fatty substance into the dough and dispersing it uniformly throughout the dough, destroying the flakiness of the final product. This problem is promoted both by the working of the dough and the heat that working generates and will, if not absolutely minimized, defeat the formation of discrete dough strata and the resultant tendency to form flakes after baking.

In other words, the object of the ingredient blending and dough working operation with pie crust and similar doughs is to maintain the integrity of numerous strata which, after baking, will flake separately in the crust, thus giving the desired flaky texture to the crust. At the same time, the dough must be worked enough to give the sheet significant integrity to permit subsequent handling steps to go forward. In this respect, the working of pie crust dough from a large substantially round dough mass into a dough sheet is substantially the same as that for yeast breads insofar as once the dough is formed, the stratified fat and flour strata form an architecture which should be preserved to maintain the quality of the baked goods.

More precisely, the object of the handling operation in pie crust dough formation is to achieve the formation of a dough mass into a thin sheet and final product with a minimal amount of handling and with a correspondingly relatively minimal and predictable disruption of the architecture of the dough.

One of the most common methods of working dough is the passing of the dough between a pair of calendar rollers whose separation is adjustable to any desired gap. In principle, this can be employed to form a relatively thick sheet from dough in a bin or hopper. Typically, such calendaring is then successively applied to the sheet of dough to successively reduce the thinness of the dough sheet. However, continuous calendaring of dough from a bin almost inevitably will impart unacceptable levels of uniaxiality and damage to the molecular gluten strands, and thus is not a commercially acceptable method of working a well developed gluten matrix.

Generally, calendar sheet formation and reduction of the thickness of a sheet of yeast dough is achieved by a combination of pulling and pressing. For example, dough which is to be reduced in thickness by factor of six is pulled away from a conveyer, at a speed which is quicker than the speed at which it is being fed into a pair of reducing rollers by the same factor (namely, six in this example) as the desired reduction in thickness. In the case of yeast dough, the stretchability and resilience of the dough allows a substantial amount of leeway. However in the case of stratified unleavened margarine flour dough, care must be taken not to apply tension to the dough sheet in order to avoid the tendency of the dough sheet to break apart. Generally, the greater the reduction in thickness of the dough, the greater the damage to the gluten matrix.

In commercial applications, yeast dough is made in relatively large batches on the order of 680 kilograms. Even a small system works with batches on the order of 340 kilograms. While, in principle, it is possible, as noted above, to force the kneaded dough through a continuous forming operation to form a continuous dough billet or sheet, the stresses that would be applied during such an operation would too seriously damage the gluten structure. This type of damage is particularly undesirable in the case of high moisture doughs which typically have a moisture content, by weight, equal to or greater than 50% the weight of the flour in the dough. Such 50% or greater water doughs can develop free water if significant damage is done because of excessive shear to the gluten structure.

This reduces shelf life and will result in ice crystals in the bread if it is frozen.

One approach to the problem is the metering of chunks of dough from a hopper containing the kneaded product. This is achieved by using a pair of cooperating cutter blades, typically mounted three on a spindle, which cooperate with each other to remove chunks of dough. Such cutters are typically on the order of a meter long with cutter element diameters of about 0.5 meters. Each of the cutter elements typically comprises a spindle with three blades spaced equiangularly, 120 degrees apart, with respect to each other around the spindle. The problem with this approach, however, is that the dough tends to stick to the blades. This problem is particularly acute in the case of high water doughs, which are usually sticky.

SUMMARY OF THE INVENTION

The invention, as claimed, is intended to provide a remedy. It solves the problem of how to provide a reliable and consistent way of dropping a chuck or strip of dough onto a conveyer, at a predetermined position with respect to advancement of the conveyer and centered on the conveyer without the operation being compromised by being slowed down and without unevenness.

The inventive dough sheeting system comprises a cutter assembly for pulling and cutting elongated chunks of dough from a hopper containing dough. A receiving surface is disposed beneath the cutter assembly. A motor advances the receiving surface in the direction of dough feed. A calendar assembly receives dough output by the receiving surface and outputs a sheet of dough. A level sensor monitors the height of accumulated dough at the input of the calendar assembly and produces a signal when the input exceeds a predetermined level. The motor is responsive to the signal from the level sensor to stop advancing the receiving surface when the level exceeds the predetermined level and is responsive to the signal when the height is reduced. A movement sensor monitors the advancement of the receiving surface to actuate the cutter assembly to pull and cut a chunk of dough when the surface has advanced a predetermined distance from the position at which the surface was positioned when a prior chunk of dough was delivered to the surface.

In accordance with a preferred embodiment of the invention a cutter assembly pulls and cuts elongated chunks of dough from the hopper containing dough. The cutter assembly is comprised of a plurality of flat members of substantially rectangular shape. The flat members are positioned to form a cutting assembly with a cross-sectional Y-shaped configuration, the plurality of radially extending planar members are positioned for rotation about an axis or, in an alternative configuration, are positioned to form a tubular pipe-like member.

In accordance with the preferred embodiment of the invention, release of the dough chunk from the cutter assembly is facilitated by the introduction of air under pressure at the interface between the dough chunk and the cutter assembly.

A pulling assembly is disposed under the cutter assembly and is responsive to the operation of the cutter assembly to pull chunks of dough from the cutter assembly.

BRIEF DESCRIPTION OF THE DRAWINGS

One way of carrying out the invention is described in detail below with reference to drawings which illustrate only two specific embodiments of the invention and in which:

FIG. 17 is a view illustrating an alternative position of the receiving assembly illustrated in FIG. 13.

DETAILED DESCRIPTION OF THE PREFERRED EMBODIMENTS

Figure 1:
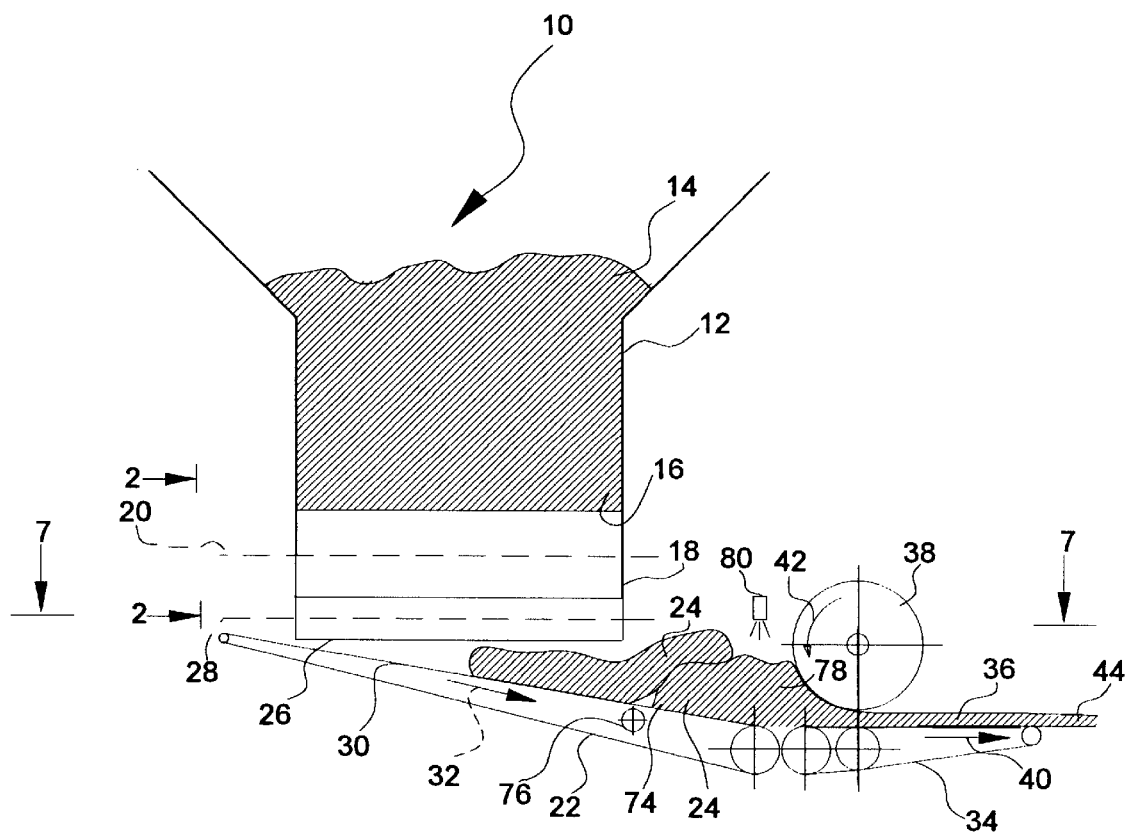
FIG. 1 is a diagrammatic representation of the inventive sheet forming system.
Figure 2:
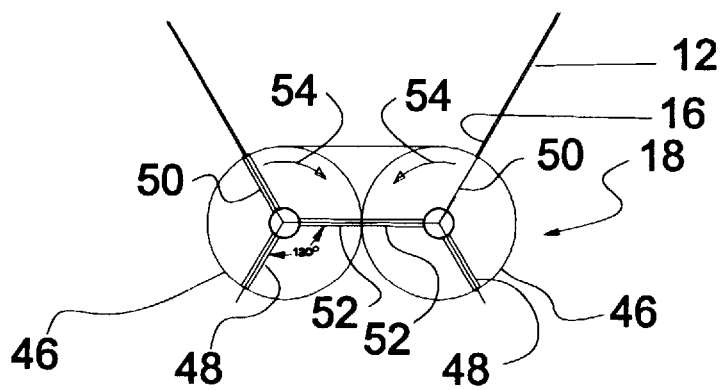
FIG. 2 is a diagrammatic cross sectional view of the cutter blade of the inventive system.
Figure 3:
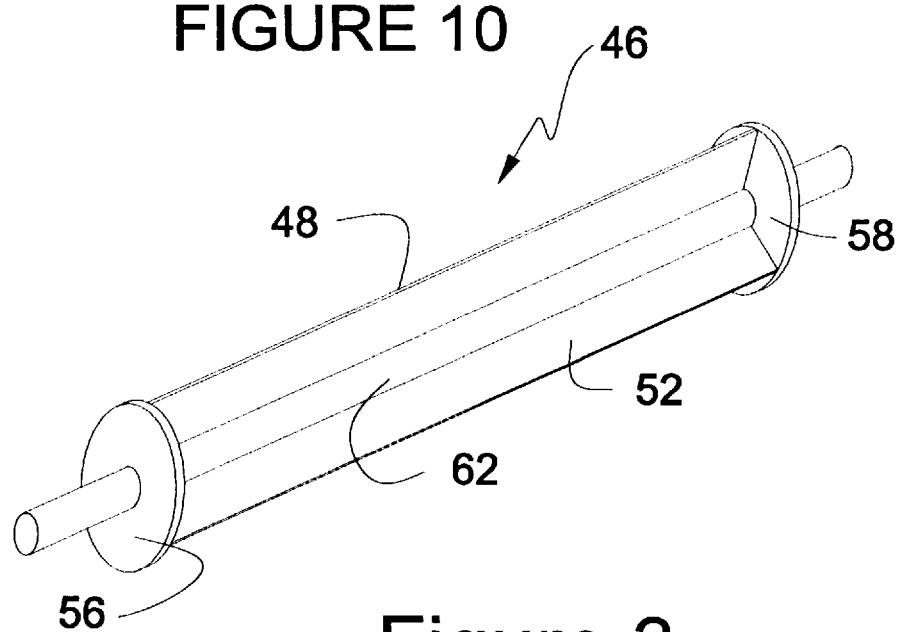
FIG. 3 is a perspective of the blades illustrated in FIG. 2.

Referring to FIGS. 1 to 3, a dough sheeting system 10 constructed in accordance with the present invention is illustrated. More particularly, as illustrated in FIG. 1, the inventive dough sheeting system 10 comprises a bin 12 for holding a quantity of dough 14. Bin 12 is made of sheet metal, preferably stainless steel. Bin 12 defines an opening 16, through which dough 14 passes for further processing.

Opening 16 is closed by blade assembly 18, which rotates along an axis 20. Beneath blade assembly 18, a conveyer belt 22 is positioned to receive severed strips of dough 24. The removal of strips of dough 24 from blade assembly 18 is insured by a pair of pulling rollers 26, which rotate along axes 28 and pneumatic release system, as described below.

The top surface 30 of conveyer 22 advances in the direction indicated by arrow 32. This results in advancing strips 24 toward a second conveyer 34 which has a top surface 36. Top surface 36 is disposed in facing spaced relationship to a calendar roller 38. Top surface 36 is advanced in the direction indicated by arrow 40. Likewise, calendar roller 38 is rotated in the direction indicated by arrow 42. This results in pulling dough strips 24 between conveyer 34 and calendar roller 38. Because the gap between surface 36 and roller 38 is relatively narrow, the sheet of dough 44 exiting from the inventive system 10 is of relatively thin gauge.

Referring to FIG. 2, the construction of blade assembly 18 is illustrated. It is noted that rollers 26 are not illustrated in this figure for purposes of clarity of illustration. Blade assembly 18 comprises a pair of three-blade rotary cutters 46. Rotary cutters 46 each comprise three blades 48, 50 and 52. Each of the cutters 46 rotates in the direction shown by its respective arrow 54.

The construction of the rotary cutters 46 is illustrated in the perspective drawing of FIG. 3. Blades 48, 50 and 52 are secured between a pair of disks 56 and 58. Discs 56 and 58 have a plurality of holes 59 disposed therein, as can be seen most clearly in FIG. 2. Holes 59 are fed with compressed air through their respective manifolds 61, as can also be seen in FIG. 2. Means for mounting a suitable rotating support, such as bearings, is provided by a pipe 62. Pipe 62 may be welded to disks 56 and 58. In similar fashion, blades 48–52 are welded to disks 56 and 58 and also welded to pipe 62.

Figure 4:
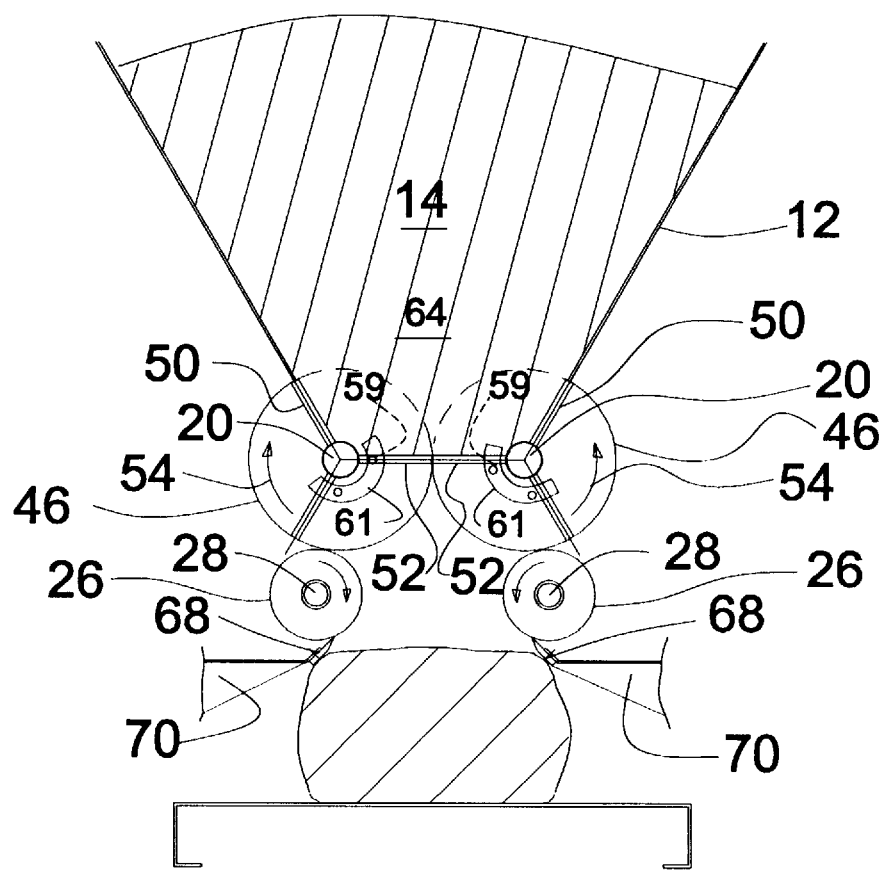
FIG. 4 is a view similar to FIG. 2, showing a first state in the operation of the inventive system.
Figure 5:
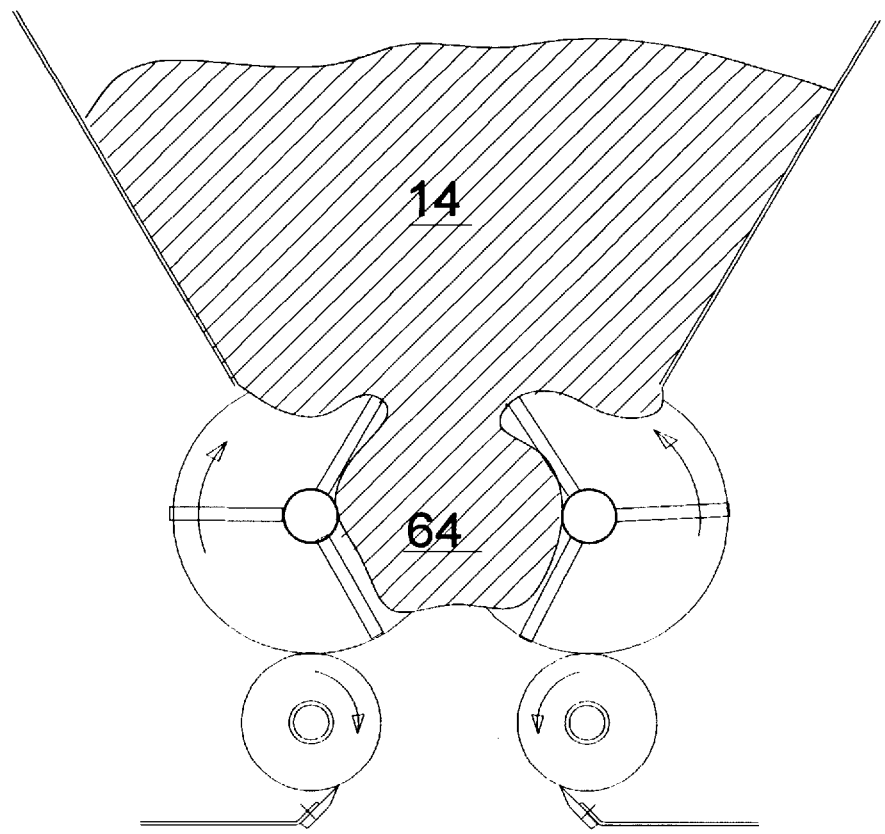
FIG. 5 is a view similar to that of FIG. 4, illustrating a second state in accordance with the present invention.
Figure 5:
Figure 6:
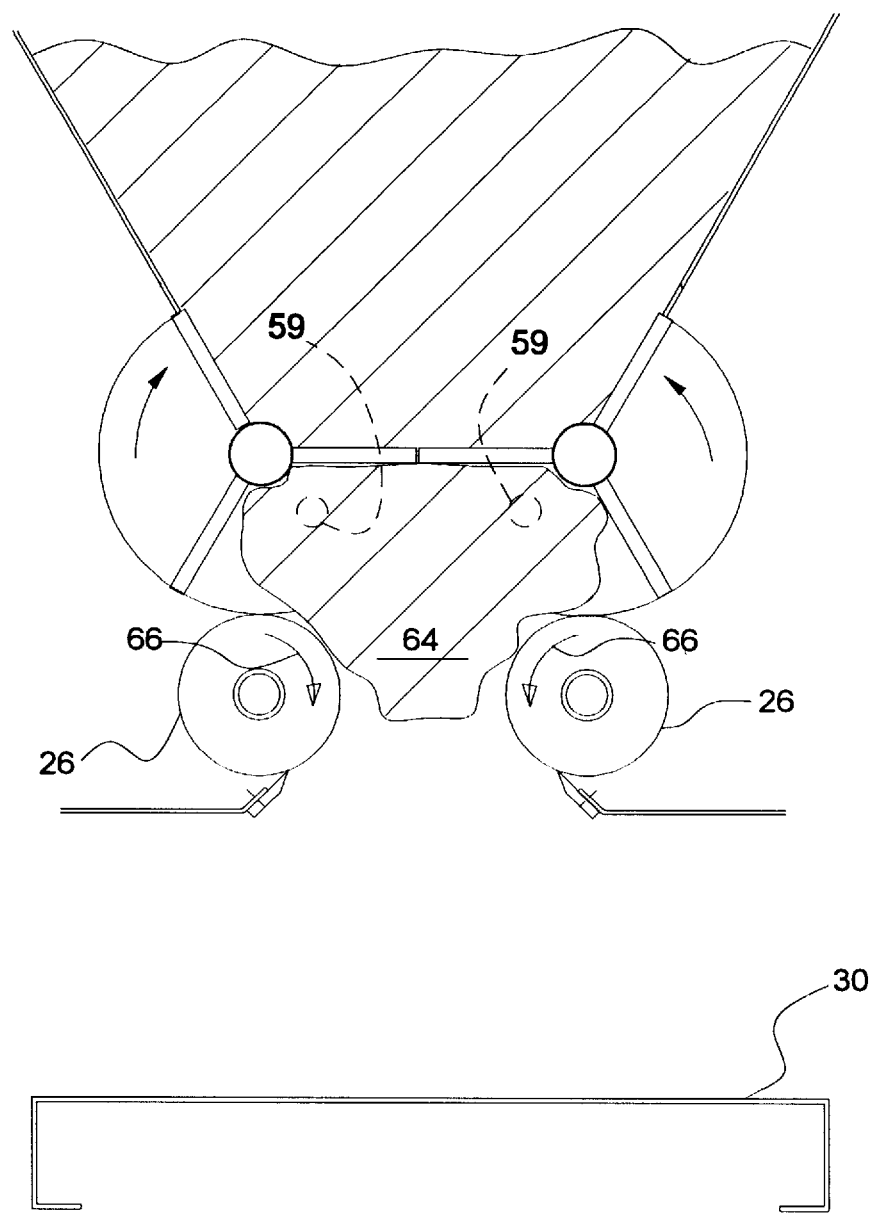
FIG. 6 is a view similar to that illustrated in FIG. 4, showing the inventive system in a second state.

The operation of the inventive system may be understood with reference to FIGS. 4, 5 and 6. More particularly, with reference to FIG. 4, consider the generation in continuous fashion of strips of dough 24 from an arbitrary position with blades 52 in abutting relationship.

As rotary cutters 46 turn in the direction of their respective arrows 54, the portion 64 of dough 14 which rests above plates 52 is engaged, cut and driven by cooperating blades 50. The result is the advancement of portion 64 of dough 14 to the position illustrated in FIG. 5. As rotation continues, portion 64 is driven forward to the position illustrated in FIG. 6. In this position, portion 64 is engaged by rollers 26. Rollers 26 rotate in the directions indicated by arrows 66. As a consequence, portion 64 is fictionally engaged by the surfaces of rollers 26 and driven outwardly toward the top surface 30 of conveyer belt 22.

As can be seen most clearly with reference to FIG. 3, blades 48, 50 and 52 are approximately 76 cm in length. Thus, each strip 24 of dough is also approximately 76 cm in length. Release of strips 24 is accommodated by coating plates 48, 50 and 52 with SILVERSTONE ™ plastic. This results in a more sure grasping of portion 64 by rollers 26. Release by rollers 26 is promoted through the use of a pair of doctor blades 68 on supports 70. Doctor blades 68 bear against the surfaces of their respective rollers as is illustrated most clearly in FIG. 4.

The release of strips of dough 24 is further promoted by the introduction of compressed air into the interface between the dough 14 and the blade assembly 18. Compressed air is introduced through holes 59 which. As in be seen in FIG. 8, air is provided by a hose 63, which feeds manifolds 61, which each incorporate inner passages 65, through which air flows in the direction of arrows 67.

Figure 9:
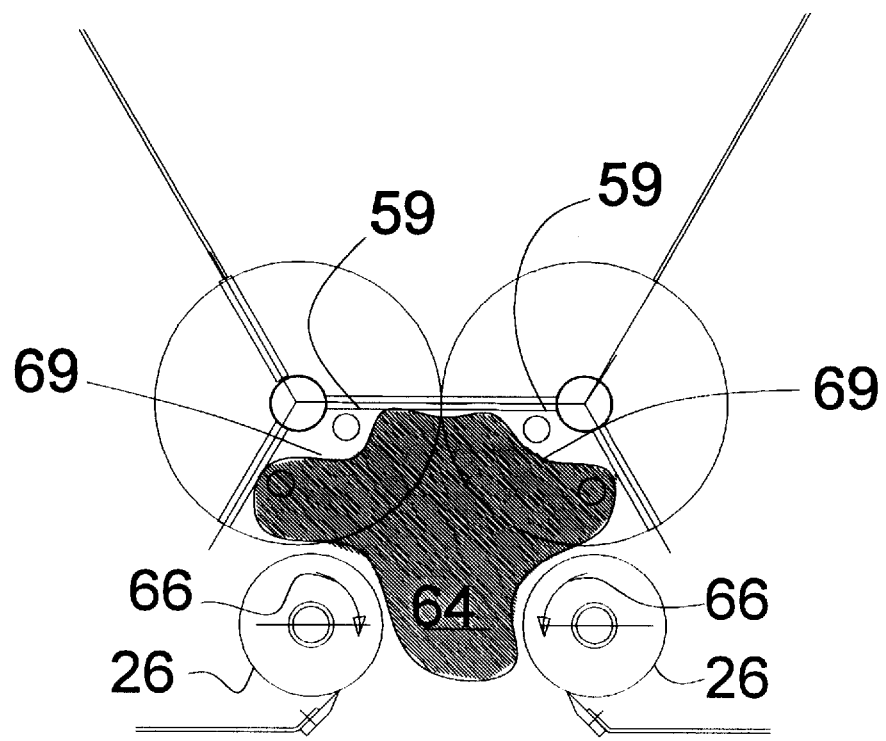
FIG. 9 is a diagrammatic perspective view illustrating the cutter assembly of FIG. 8 during operation.
Figure 9:
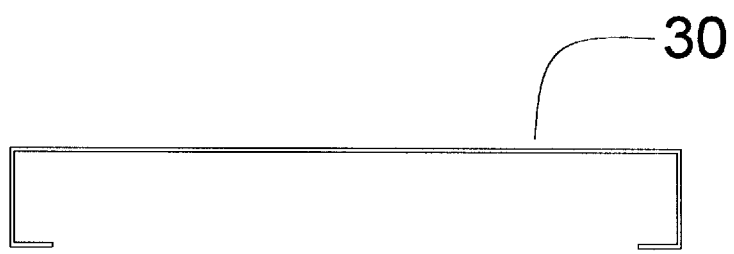

In accordance with the preferred embodiment, pressure is applied through hose 63 at that point in the chunk formation process illustrated in FIG. 6. As illustrated in FIG. 9, the result is to cause an air gap 69 to form, thus promoting the release of the dough strip.

As noted above, blade assembly 18 is approximately 76 cm in length. Thus, strips of dough 24, when they are released from the rollers 26 onto top surface 30 have a length of approximately seventy centimeters. The speed of conveyer 22 is adjusted in such a manner that when a strip of dough 24 such as that illustrated in FIG. 7, falls on conveyer 22, its forward end 72 overlies the rearward end 74 of the strip 24 which preceded it.

More particularly, the movement of conveyer 22 is made responsive to the condition of the chunks of dough being produced and dropped onto it. This may be achieved in a simple fashion because of the known length of the strips of dough, which are being produced by the blade assembly and then being pulled by the rollers, which underlie the blade assembly.

In accordance with the present invention, control of the movement of belt 22 is achieved through the use of a distance measuring sensor 76, which may be of the pulse generating or other known type. As can be seen most clearly in FIG. 1, strips of dough 24 are advanced by conveyer 22 and are pressed between top surface 36 and the bottom of roller 38. Naturally, different doughs have different characteristics and their being worked between roller 38 and conveyer 34 will result in varying the draw of dough from conveyer 22. Moreover, it is typical for the operator of the sheeting system 10 to vary the gap between roller 38 and top surface 36. This adjustment will also vary the rate at which dough is drawn from the end of conveyer 22.

As dough is fed between roller 38 and top surface 36, it tends to accumulate in a mass 78 on the opposite side of the calendar roller 38 from sheet 44. The amount of such accumulation is measured by a level sensor 80. When the level of any accumulation 78 becomes too high, a signal is sent to the system controlling the motor which advances conveyer 22 and the movement of conveyer 22 is reduced in speed. However, the movement of conveyer 34 is continued, as is the movement of roller 38. The result is that the accumulation 78 of dough at the input of the calendar roller 88 is reduced until that reduced level is detected by sensor 80 which then sends a signal to the motor driving conveyer 22 telling conveyer 22 to increase speed in the direction indicated by arrow 32.

Thus the accumulation of dough is being continually monitored by the system which feeds dough from conveyer 22 only when it is needed. Likewise, when conveyer 22 has advanced a distance corresponding to a desired portion of the length of a strip of dough, blade assembly 18 and rollers 26 are rotated to cut and drop another strip of dough 24. In accordance with the invention, the overlap between successive chunks of dough can be varied in accordance with the characteristics of the dough being worked and the product being produced.

As is illustrated in FIG. 1, chunk overlap has been set for about 20% in accordance with the preferred embodiment of the invention. This is a typical choice for the manufacture of many products. As alluded to above, such an amount of overlap is achieved by activating blade assembly 18, when distance sensor 76 has detected movement of conveyer 22 corresponding to a distance equal to 80 percent of the length of chunk 24.

In principle, overlaps on the order of approximately 50 percent are practical in many product manufacturing situations. Moreover, because release of chunks of dough can be achieved without spraying the dough with oil or other artifices, merging between successive chunks of dough at the point of overlap is of good quality and therefore the sheet of dough produced by the system has good integrity.

Figure 7:
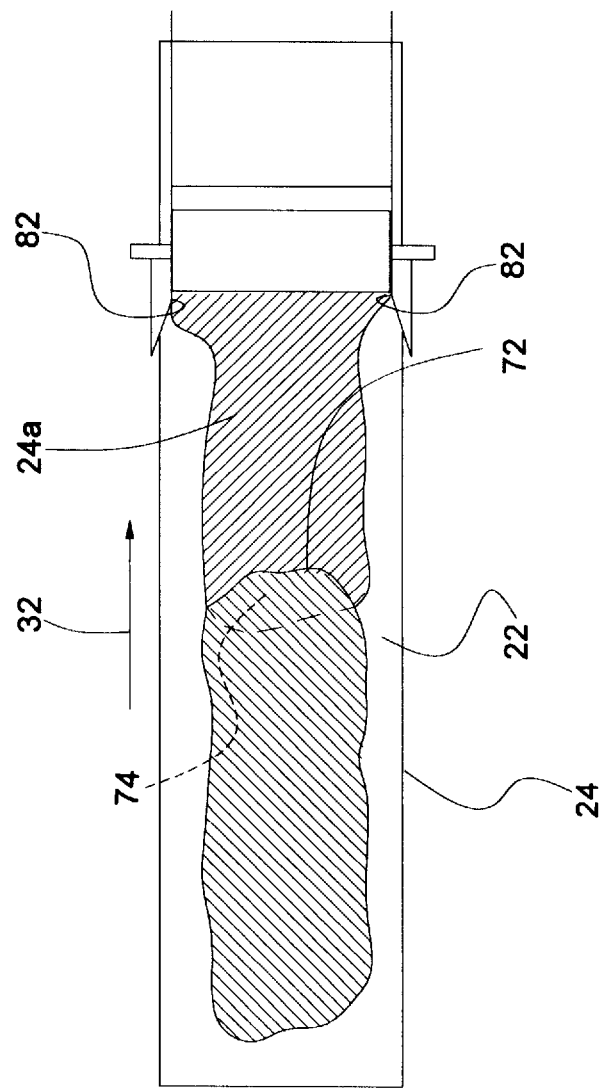
FIG. 7 is a view along lines 7—7 of FIG. 1.

Consistent with the other high quality aspects of the sheet being produced, good edging is provided by a pair of fences 82, as illustrated most clearly in FIG. 7. The use of such fences is of particular value in accordance with the present invention because of the objectives of high throughput without overly demanding operator requirements. In this regard, it is anticipated that the inventive system will be releasing chunks of dough having a weight of approximately 18 kg each with a throughput of approximately 5,500 kg per hour.

Figure 10:
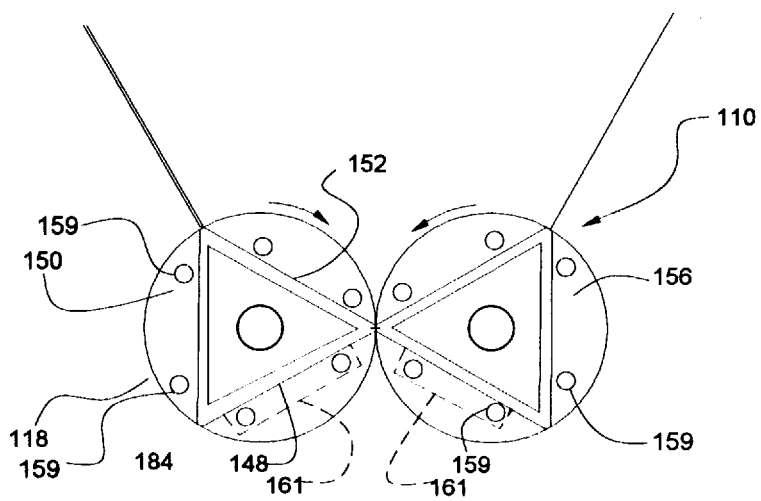
FIG. 10 is a view illustrating an alternative cutter assembly.

In accordance with a preferred embodiment of the invention, cutting is performed by solid triangular cutters. More particularly, as illustrated in FIG. 10, an alternative cutter assembly 118 is used in an alternative system 110. Cutter assembly 118 is machined from ultra high molecular weight polyethylene (UHMW) to form a body with a triangular cross section with surfaces 148, 150 and 152, and a round disk 156 at each end, as illustrated more clearly in FIG. 11. In accordance with this embodiment of the invention, holes 159 are provided for introducing compressed air between the dough strip about to be released and the cutter assembly. Such compressed air is provided through a pair of plastic manifolds 161, similar to manifolds 61, except that the pattern of holes and the shape of the plastic blocks of which they are made is different.

Figure 11:
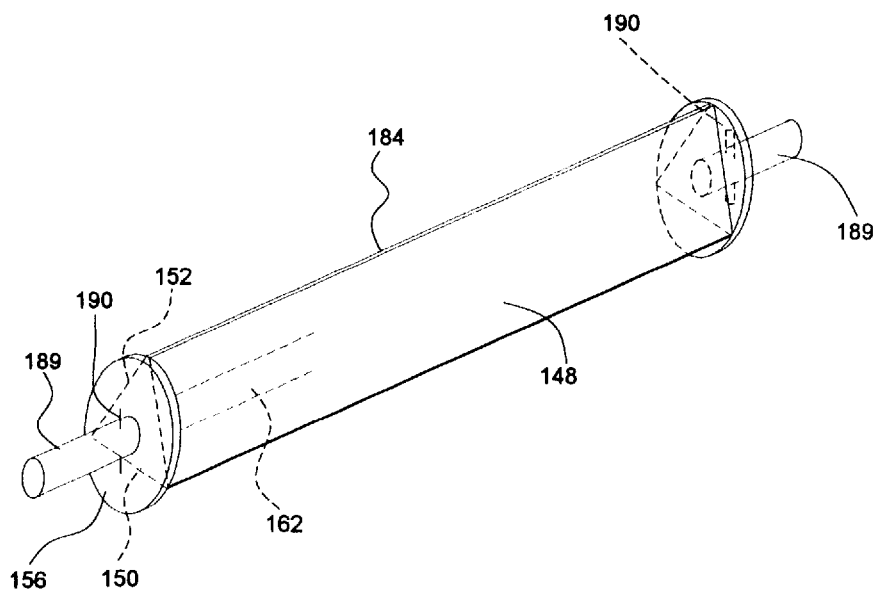
FIG. 11 is a perspective view illustrating the cutter assembly of FIG. 8.

The construction of cutter assembly 118 is similar to that of assembly 18. As illustrated in FIG. 11, the structure is completed by a stainless steel shaft 189, which is press fitted through the UHMW-PE body with surfaces 148, 150 and 152, of assembly 118 and is secured by pins 190, which are press fitted through shafts 189 and bearing against the UHMW-PE body. Pins 190 are perpendicular to the centerline of the UHMW-PE body and the stainless steel shaft 189.

Figure 8:
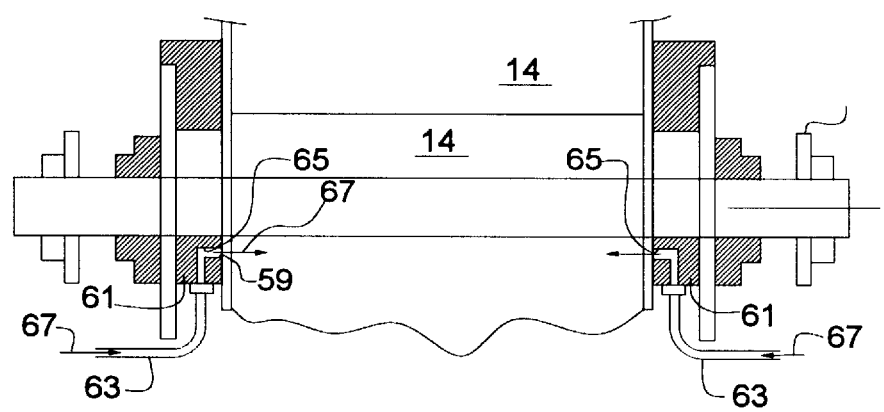
FIG. 8 is a diagrammatic view illustrating an alternative cutter assembly.

As an alternative to the pneumatic system illustrated in the detail in connection with the FIG. 8 embodiment (which may also be used in conjunction with the FIG. 10 embodiment), it is also possible to hollow out the UHMW-PE body and put holes in surfaces 150, 152 and 148 by providing pressure through discs 118. This can have the effect of providing very even pneumatic assisted release in the dropping of dough chunks onto the conveyor belt.

In accordance with the invention, it is also possible to use other patterns of holes. For example, it is possible to use a two hole per sector arrangement such as that shown in FIG. 12. Here a pair of holes 259 are provided one at the top of the sector and one near the outside of the sector during the release of dough. This arrangement is followed in the case of doughs where it is expected that more sticking will occur on the horizontal plates.

Figure 12:
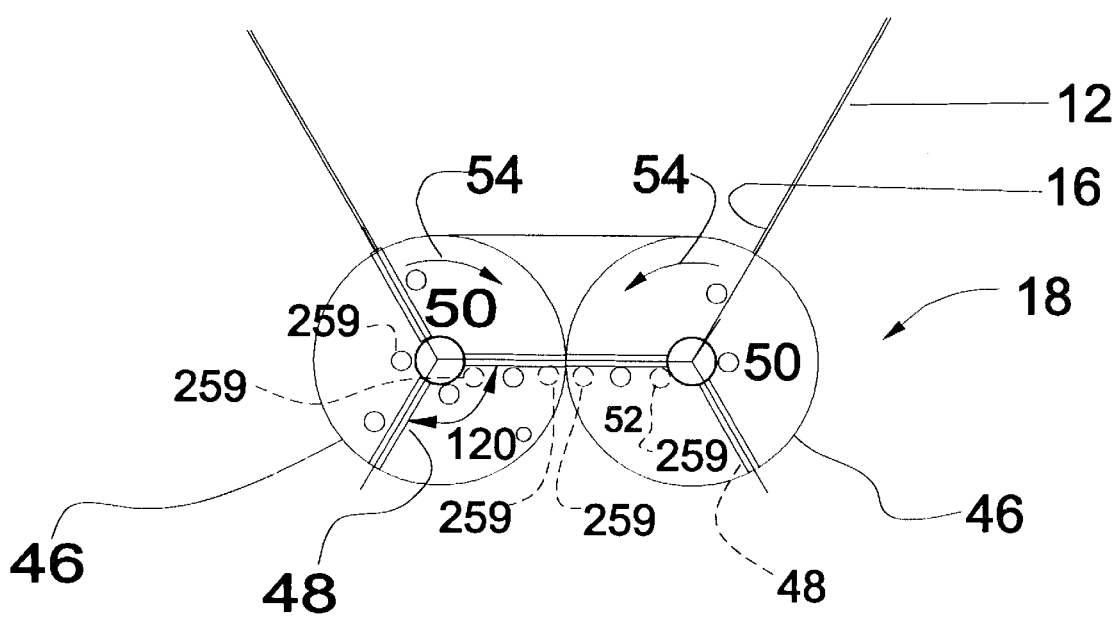
FIG. 12 is a view illustrating an alternative cutter assembly.

Indeed, if desired, still more holes arrayed along the horizontal plates may be added as illustrated in phantom lines in FIG. 12.

While, in accordance with the above embodiment, a simple manifold with a single air intake which simply branches into a number of air outputs may be used, a more elaborate arrangement may also be consider ed. For example, it is also possible to valve each of the passages in the output circuits in the manifold in such a manner that when back pressure is lost, indicating that dough has been released and the air pocket has been vented to the outside air, the valve shuts the vented output of the manifold, thus maintaining pressure at the desired level at the other outputs. Alternatively, pressure may be controlled and the source supplying the pressure simply worked harder to maintain the desired pressure.

Figure 13:
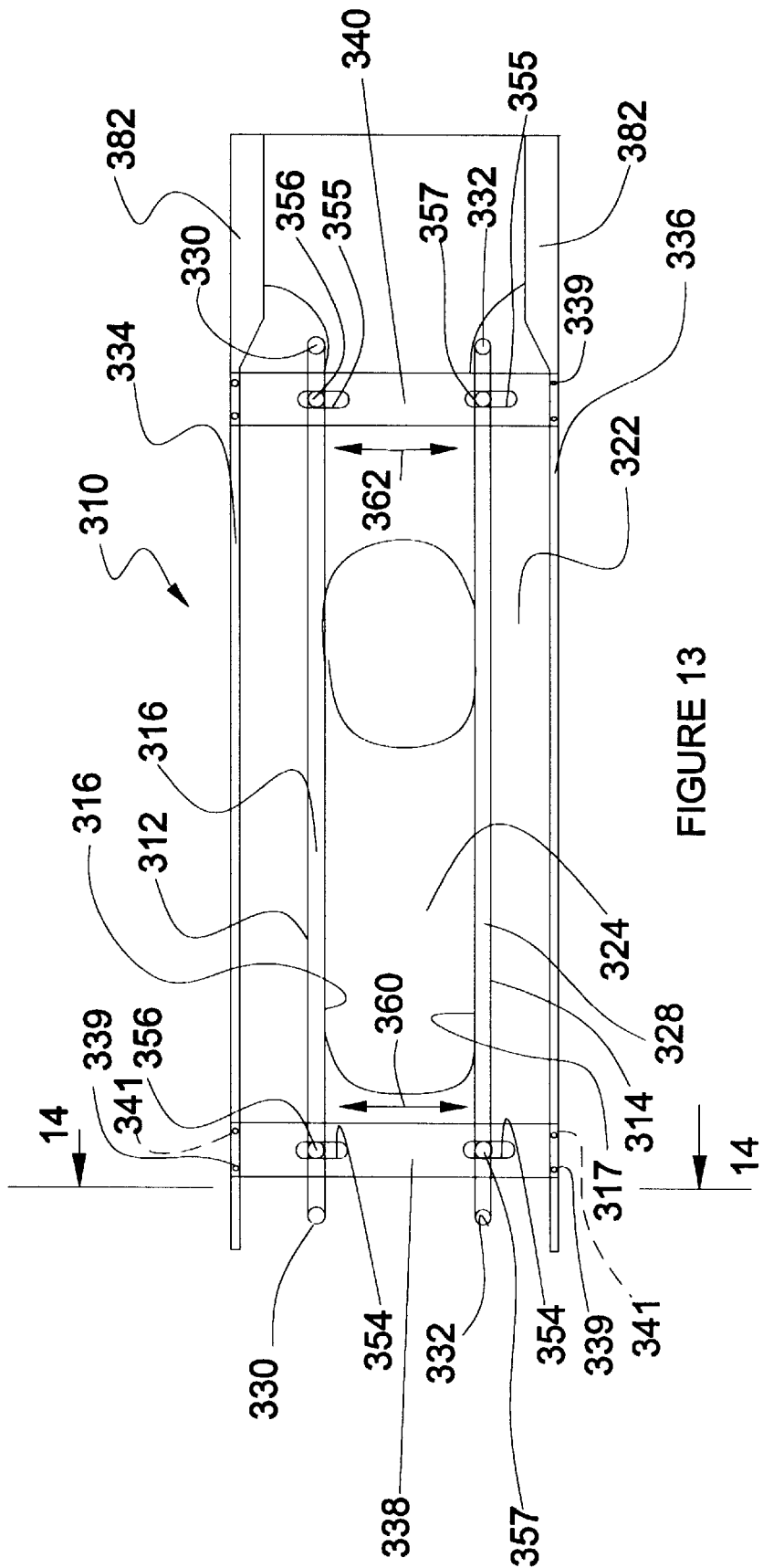
FIG. 13 is a view illustrating an alternative receiving assembly.

FIG. 13 illustrates an alternative embodiment of a dough sheeting system 310 constructed in accordance with the present invention. In this embodiment, a pair of guiding belts 312 and 314 are provided. Guiding belts 312 and 314 are positioned in front o f a pair of fences 382. Guiding belts 312 and 314 are positioned below a blade assembly 318 (not shown) positioned above the guiding belts 312 and 314 and taking the same form as, for example, blade assembly 18 in FIG. 1, or any of the other blade assemblies described above. Guiding belts 312 and 314 provide for proper positioning of a strip of dough 324 on a conveyor 322. To ensure proper positioning and to accommodate doughs of 26 varying stiffness, the distance between guiding belts 312 and 314 can be adjusted at either end of guiding belts 312 and 314, as indicated by arrows 360 and 362.

In the case of stiffer doughs, which tend to result in a condition where the top dough chunk rolls over the bottom chunk and lies beside it, the distance between guiding belts 312 and 314 must be made relatively small to keep successive dough chunks in line and overlapping with their central axes substantially over each other. In the case of very low viscosity doughs, which also tend to spread and be more adhesive because of their high moisture content, guiding belts 312 and 314 should be positioned further apart to accommodate spreading of the dough chunks. In such cases the adhesion between overlapping pieces and any spreading will prevent rolling of the end of the upper chunk of dough down the side of the lower chunk of dough.

Figure 14:
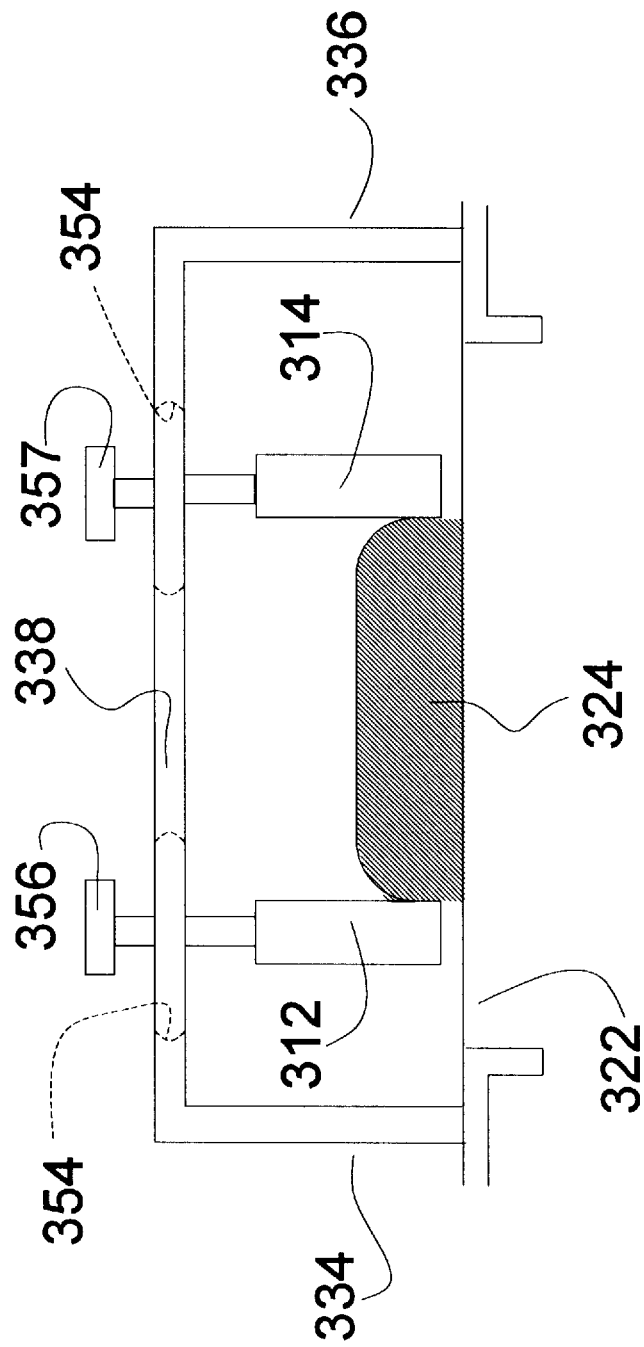
FIG. 14 is view along lines 14—14 of FIG. 13.
Figure 15:
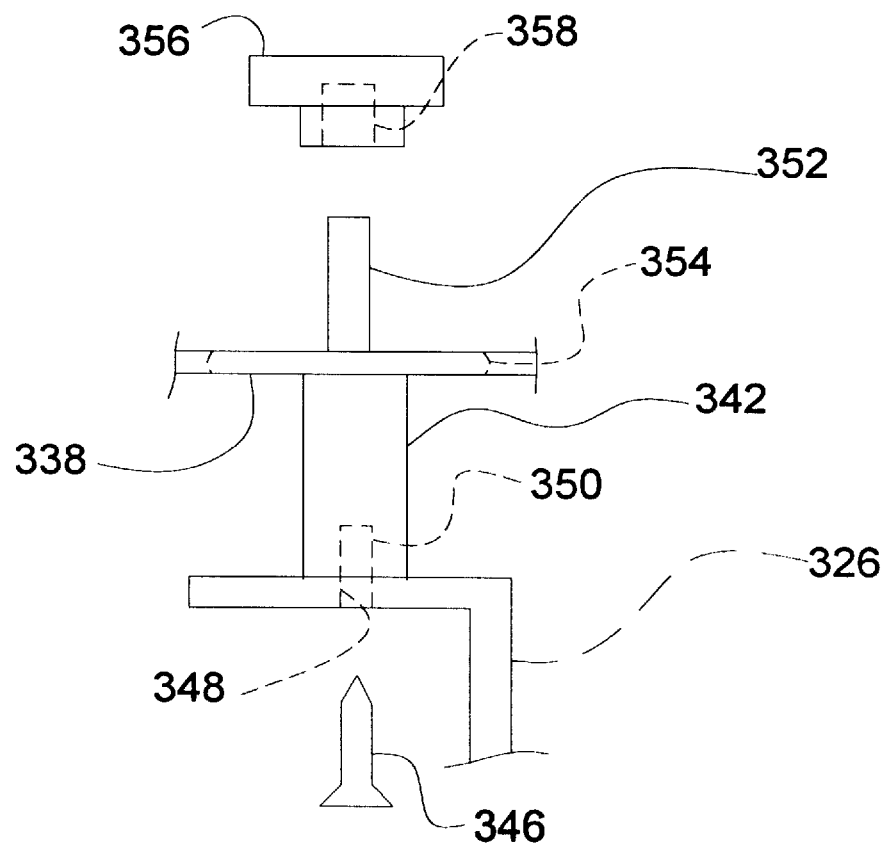
FIG. 15 is a partial view illustrating the alternative receiving assembly illustrated in FIG. 13.
Figure 16:
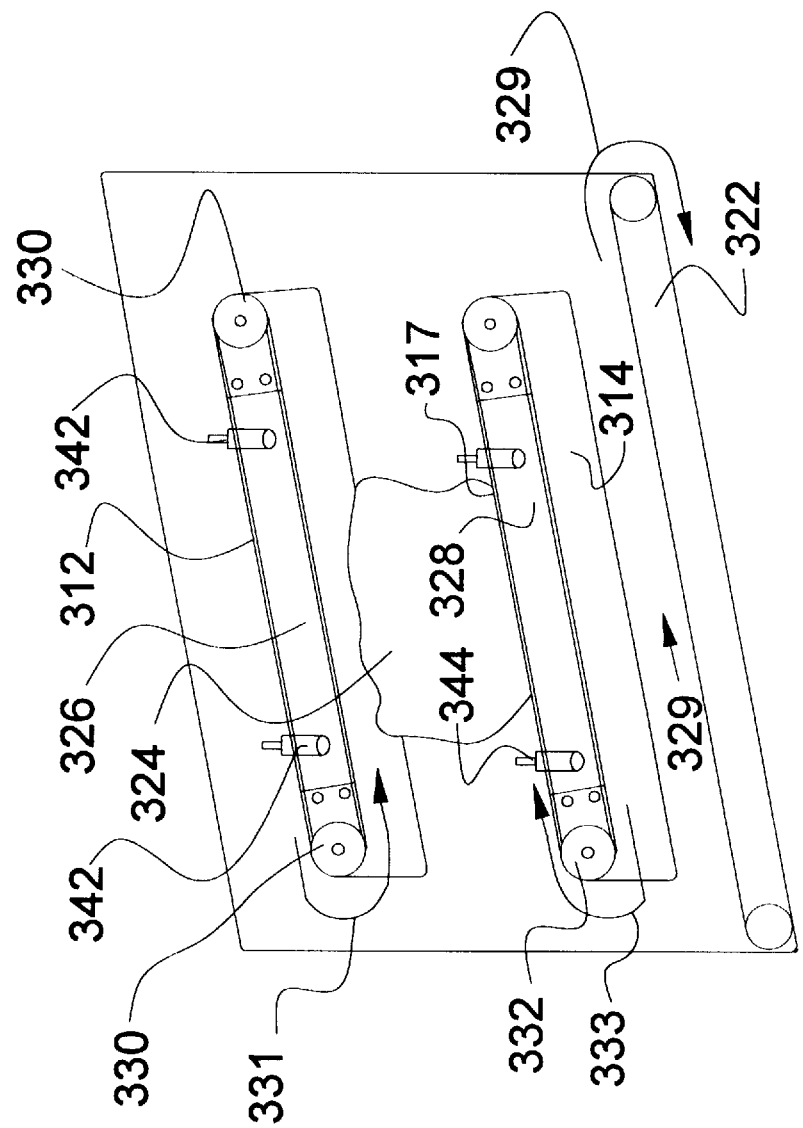
FIG. 16 is a partial view in perspective illustrating the alternative receiving assembly of FIG. 13.

Referring now to FIGS. 13–16, guiding belts 312 and 314 are mounted on a pair of frames 326 and 328 (FIG. 16). Frames 326 and 328 are provided with two pairs of rollers 330 and 332 at opposite ends of frames 326 and 328. As strip of dough 324 is advanced by forward movement of conveyor 322 indicated by arrows 329, rollers 330 and 332 allow guiding belts 312 and 314 to move in the direction of arrows 331 and 333, being driven by strip of dough 324 as advancing strip of dough 324 makes contact with contact surfaces 316 and 317. Frames 326 and 328 comprise a planar member which contacts and supports surfaces 316 and 317, maintaining them in a planar configuration.

Referring in particular to FIGS. 13 and 14, a pair of side walls 334 and 336 are mounted to dough sheeting system 310 at the periphery of conveyor 322 providing a support structure for guiding belts 312 and 314. A pair of top mounting brackets 338 and 340 are affixed to side walls 334 and 336. Mounting brackets 338 and 340 can be affixed to side walls 334 and 336 through the use of mounting screws 339 (FIG. 13) passing through holes 341 of mounting brackets 338 and 340. Mounting brackets 338 and 340 have elongated holes 354 and 355 to provide for a movable mounting of guiding belts 312 and 314 at a range of positions in order to accommodate doughs having different characteristics, as is discussed, for example, above with respect to varying stiffness.

Frames 326 and 328 are movably mounted to mounting brackets 338 and 340 through the use of support shafts 342 and 344 (FIG. 16) which provide for the movable mounting of guiding belts 312 and 314. Rollers 330 and 332 are mounted on frames 326 and 328, respectively, forming a pair of assemblies that may be adjustably positioned.

As can be seen in FIG. 15, a detailed view of one of shafts 342 (which is identical in mirror image to shafts 344) is illustrated. Support shaft 342 is affixed to frame 326 by screws 346. Screws 346 pass through their respective holes 348 and into threaded holes 350 in support shafts 342. On the opposite end of each support shaft 342 a threaded shaft 352 is affixed to support shaft 342. Threaded shaft 352 passes through elongated holes 354 and 355 of mounting brackets 338 and 340 (FIG. 13). Knobs 356 are proved with a threaded holes 358. Threaded hole 358 enables knob 356 to secure support shaft 342 at a desired position to mounting bracket 338 (FIG. 15). Frame 328 is identically mounted, through support shafts 344 and knobs 357.

The diameter of support shaft 342 and knob 356 is substantially lager than the width of hole 354, however, the width of hole 354 is several times larger than its width. Thus, the distance between guiding belts 312 and 314 can be adjusted in the direction of arrows 360 and 362 as indicated in FIGS. 13 and 17. As an alternative embodiment, guiding belts 312 and 314 may be fixed at one end while the other end is movably mounted in accordance the aforementioned alternative embodiment.

While an illustrative embodiment of the invention has been described above, it is, of course, understood that various modifications will be apparent to those of ordinary skill in the art. For example, the rotating cutter assembly may be replaced by a reciprocating assembly, and this reciprocating assembly may be fed with pneumatic pressure by flexible rubber tubes permanently coupled to the cutter assembly. Such modifications are within the spirit and scope of the invention, which is limited and defined only by the appended claims.

I claim:

1. A dough sheeting system, comprising:

(a) a cutter assembly for engaging, along a dough to assembly interface, pulling and cutting elongated chunks of dough from a hopper containing dough;

(b) a mechanically driven system for movably mounting said cutter assembly;

(c) a receiving surface disposed beneath said cutter assembly;

(d) a pneumatic air system for introducing air, under pressure and at said dough to assembly interfaces between a cut chunk and said cutter assembly to promote disengagement of said chunk from said cutter assembly;

(e) a motor for advancing said receiving surface in a direction of dough feed;

(f) a calendar assembly for receiving dough output by said receiving surface and outputting a sheet of dough;

(g) a level sensor for monitoring the height of accumulated dough at the input of said calendar assembly and for producing a signal when said input height exceeds a predetermined level, said motor being responsive to said signal from said level sensor to stop advancing said receiving surface when said level exceeds said predetermined level and being responsive to said signal when said height is reduced; and (h) a movement sensor monitoring the advancement of said receiving surface to actuate said cutter assembly to pull and cut a chunk of dough when said surface has advanced a predetermined distance from the position at which said surface was positioned when a prior chunk of dough was delivered to said surface.

2. A dough sheeting system as in claim 1, wherein said cutter assembly is coated with a non stick material.

3. A dough sheeting system, comprising:
   (a) a pair of facing support members mounted for rotation;
   (b) a cutter assembly for pulling and cutting elongated chunks of dough from a hopper containing dough, said cutter assembly being comprised of a plurality of substantially flat members, said flat members being positioned between said pair of support members to form a tubular member; and
   (c) a pneumatic system comprising at least one hole defined in one of said support members and a manifold having an input port and an output port, said input port being coupled to said air system and said output port being coupled to said hole, said pneumatic air system introducing air under pressure at said interface and between said chunk and said cutter assembly to promote disengagement of said chunk from said cutter assembly.

4. A dough sheeting system as in claim 3, further comprising:
   (d) a receiving surface disposed beneath said cutter assembly;
   (e) a motor for advancing said receiving surface in a direction of dough feed; and
   (f) a calendar assembly for receiving dough output by said receiving surface and outputting a sheet of dough.

5. A dough sheeting system as in claim 4, wherein said cutter assembly is coated with a non stick material.

6. A dough sheeting system, comprising:
   (a) a pair of facing support members mounted for rotation;
   (b) a chunker assembly comprised of a number of blade and blade support members for engaging, along a dough to assembly interface, said dough bearing against one or more of said members, said chunker assembly, blade and blade support members being positioned, configured, dimensioned and mounted to be driven and to pull and cut chunks of dough from a hopper containing dough; and
   (c) a pneumatic air system for introducing through said members air, under pressure and at said dough to assembly interface, between a cut chunk and said chunker assembly members, said air under pressure acting to promote disengagement of said chunk from said chunker assembly.

7. A dough sheeting system as in claim 3, wherein said pneumatic air system further comprises at least a second hole defined in the other of said support members and a second manifold block, said second manifold block having an input port and an output port, said input port being coupled to said air system and said output port being coupled to said second hole, said pneumatic air system introducing air under pressure at said interface between said chunk and said cutter assembly to promote disengagement of said chunk from said cutter assembly.

8. A dough sheeting system as in claim 7, wherein said cutter assembly is coated with a non stick material.

9. A dough sheeting system as in claim 8, wherein said flat members are made of plastic.

10. A dough sheeting system, comprising:
    (a) a pair of facing support members mounted for rotation;
    (b) a cutter assembly for engaging dough to be made into a sheet along a dough to assembly interface, for pulling and cutting elongated chunks of dough from a hopper containing dough;
    (c) a receiving surface disposed beneath said cutter assembly;
    (d) a pneumatic air system having at least one hole defined in one of said support members and a manifold having an input port and an output port, said input port being coupled to said air system and said output port being coupled to said hole, said pneumatic air system introducing air under pressure at said interface between said chunk and said cutter assembly to promote disengagement of said chunk from said cutter assembly;
    (e) a motor for advancing said receiving surface in a direction of dough feed;
    (f) a calendar assembly for receiving dough output by said receiving surface and outputting a sheet of dough; and
    (g) a pulling assembly positioned below said cutter assembly and being responsive to the operation of said cutter assembly to pull chunks of dough from said cutter assembly.

11. The dough sheeting assembly as in claim 10, further comprising:
    (h) a level sensor for monitoring the height of accumulated dough at the input of said calendar assembly and for producing a signal when said input height exceeds a predetermined level, said motor being responsive to said signal from said level sensor to stop advancing said receiving surface when said height exceeds said predetermined level and being responsive to said signal when said height is reduced; and
    (i) a movement sensor monitoring the advancement of said receiving surface to actuate said cutter assembly to pull and cut a chunk of dough when said surface has advanced a predetermined distance from the position at which said surface was positioned when a prior chunk of dough was delivered to said surface.

12. A dough sheeting system as in claim 1, wherein said cutter assembly comprises a plurality of radially extending planar members positioned for rotation about an axis.

13. A dough sheeting system, comprising:
    (a) a cutter assembly for engaging, along a dough to assembly interface, pulling and cutting elongated chunks of dough from a hopper containing dough;
    (b) a drive system for mechanically driving said cutter assembly;
    (c) a receiving surface disposed beneath said cutter assembly;
    (d) a motor for advancing said receiving surface in a direction of dough feed;
    (e) a calendar assembly for receiving dough output by said receiving surface and outputting a sheet of dough; and
    (f) a guiding assembly positioned below said cutter assembly and being responsive to the operation of said cutter assembly to guide chunks of dough from said cutter assembly.

14. A dough sheeting system as in claim 13, wherein said guiding assembly comprises a pair of movable side walls mounted for movement in the direction of said receiving surface.

15. A dough sheeting system as in claim 14, wherein said movable side walls comprise a pair of facing spaced closed loops of belting.

16. A dough sheeting system as in claim 14, wherein said movable side walls arc movably mounted at one end to provide for a variable distance between said side walls.

17. A dough sheeting system as in claim 14, wherein said movable side walls are movably mounted at both ends to provide for a variable distance between said side walls.

18. A dough sheeting system as in claim 13, wherein said dough sheeting system further comprises a pneumatic output port for introducing air at said interface under pressure between said chunk and said cutter assembly to promote disengagement of said chunk from said cutter assembly.

19. A dough sheeting system as in claim 13, wherein said dough sheeting system further comprises a level sensor for monitoring the height of accumulated dough at the input of said calendar assembly and for producing a signal when said input height exceeds a predetermined level, said motor being responsive to said signal from said level sensor to stop advancing said receiving surface when said level exceeds said predetermined level and being responsive to said signal when said height is reduced.

20. A dough sheeting system as in claim 13, wherein said dough sheeting system further comprises a movement sensor monitoring the advancement of said receiving surface to actuate said cutter assembly to pull and cut a chunk of dough when said surface has advanced a predetermined distance from the position at which said surface was positioned when a prior chunk of dough was delivered to said surface.

21. A dough sheeting system as in claim 18, wherein said movable side walls are movably mounted at both ends to provide for a variable distance between said side walls.

22. A dough sheeting system as in claim 21, wherein said dough sheeting system further comprises a level sensor for monitoring the height of accumulated dough at the input of said calendar assembly and for producing a signal when said input height exceeds a predetermined level, said motor being responsive to said signal from said level sensor to stop advancing said receiving surface when said level exceeds said predetermined level and being responsive to said signal when said height is reduced.

23. A dough sheeting system as in claim 22, wherein said dough sheeting system further comprises a movement sensor monitoring the advancement of said receiving surface to actuate said cutter assembly to pull and cut a chunk of dough when said surface has advanced a predetermined distance from the position at which said surface was positioned when a prior chunk of dough was delivered to said surface.

24. A dough sheeting system as in claim 14, wherein said loops of belting are rotated by said chunk of dough to advance said movable side walls formed by said loops of belting.

25. A dough sheeting system as in claim 6, wherein said air system is responsive to release of said dough from said interface.

26. A dough sheeting system as in claim 6, wherein said tubular member communicates with said hole and has a plurality of orifices for introducing air under pressure between said chunk and said chunker assembly to promote disengagement of said chunk from said chunker assembly.

27. A dough sheeting system as in claim 1, wherein said cutter assembly comprises a plurality of cutting surfaces radially displaced from the center of rotation of said cutter assembly.

28. A dough sheeting system, comprising:
(a) a cutter assembly for engaging, along a dough to assembly interface, pulling and cutting elongated chunks of dough from a hopper containing dough;
(b) a drive system for mechanically driving said cutter assembly;
(c) a receiving surface disposed beneath said cutter assembly;
(d) a guiding assembly, positioned below said cutter assembly and being responsive to the operation of said cutter assembly to guide chunks of dough from said cutter assembly
(e) a motor mechanically coupled to said dough for advancing said dough and receiving surface in a direction of dough feed; and
(f) a calendar assembly for receiving said dough and outputting a sheet of dough.

29. A dough sheeting system, comprising:
(a) a cutter assembly for engaging, along a dough to assembly interface, pulling and cutting elongated chunks of dough from a hopper containing dough;
(b) a drive system for mechanically driving said cutter assembly;
(c) a receiving surface disposed beneath said cutter assembly;
(d) a motor mechanically coupled to said dough for advancing said dough and receiving surface in a direction of dough feed;
(e) a pair of counter rotating rotary members positioned between said cutter assembly and said receiving surface to pull dough chunks from said cutter assembly onto said receiving surface; and (f) a calendar assembly for receiving said dough and outputting a sheet of dough.

30. A dough sheeting system as in claim 10, further comprising a guiding assembly, positioned below said cutter assembly and being responsive to the operation of said cutter assembly to guide chunks of dough from said cutter assembly.

* * * * *